US007505474B2

(12) United States Patent
Walter

(10) Patent No.: US 7,505,474 B2
(45) Date of Patent: Mar. 17, 2009

(54) SYSTEM FOR INTERACTIVE QUEUING THROUGH PUBLIC COMMUNICATION NETWORKS

(75) Inventor: Robert C. Walter, Atlanta, GA (US)

(73) Assignee: Queuent, Inc., Atlanta, GA (US)

( * ) Notice: Subject to any disclaimer, the term of this patent is extended or adjusted under 35 U.S.C. 154(b) by 852 days.

(21) Appl. No.: 11/005,278

(22) Filed: Dec. 6, 2004

(65) Prior Publication Data

US 2005/0122932 A1 Jun. 9, 2005

Related U.S. Application Data

(60) Provisional application No. 60/527,628, filed on Dec. 6, 2003.

(51) Int. Cl.
*H04M 3/00* (2006.01)
*H04L 12/56* (2006.01)

(52) U.S. Cl. ............. 370/412; 379/266.01; 340/825.28; 705/15

(58) Field of Classification Search ....................... None
See application file for complete search history.

(56) References Cited

U.S. PATENT DOCUMENTS 6,002,760 A * 12/1999 Gisby .................... 379/266.01
6,748,364 B1 * 6/2004 Waytena et al. ................ 705/5
6,813,608 B1 * 11/2004 Baranowski .................. 705/6
6,901,429 B2 * 5/2005 Dowling ..................... 709/203
7,222,080 B2 * 5/2007 Hale et al. ..................... 705/5
2002/0071541 A1 * 6/2002 Cheung et al. ......... 379/215.01
2003/0231647 A1 * 12/2003 Petrovykh .................. 370/429

* cited by examiner

*Primary Examiner*—Wing F Chan
*Assistant Examiner*—Robert C Scheibel
(74) *Attorney, Agent, or Firm*—George Ronald Reardon

(57) ABSTRACT

The invention pertains to a system and method of interactive queue management through public communication networks. Interactive queue management allows business or automated systems to easily and efficiently interact with waiting individuals in any queue through the individuals' preferred communication device, e.g., telephone, mobile phone, smart phone, wirelessly enabled PDA or handheld computer. In one embodiment this invention allows people to hold their place in a queue by proxy of their telephone or mobile phone number. An individual will provide their phone number to the interactive queuing system; the system will retain the phone number and other pertinent information about the individual, communicate via voice, wireless messaging, or other means with the individual, and collect the input from the individual. Key components of the system include a queue client system, a queue management and server system, an Interactive Voice Response (IVR) system, and a wireless messaging infrastructure system. Interfaces between key components will be via the Internet or other networks using standardized protocols.

10 Claims, 6 Drawing Sheets

SYSTEM FOR INTERACTIVE QUEUING THROUGH PUBLIC COMMUNICATION NETWORKS

This application claims priority to provisional application 60/527,628 dated Dec. 6, 2003, which is incorporated herein in its entirety.

BACKGROUND

1. Field of the Invention

The present invention pertains to a system employing technology products to provide customer relationship management and business process efficiency solutions, specifically in the area of customer queue management.

2. Background of the Invention

Waiting in line is a common experience, whether for a table at a popular restaurant or for the latest ride at a theme park. For most people the experience is not always pleasant. Additionally, businesses concerned about their customer relationships have had no practical way of communicating or interacting with their waiting customers. The ability to interact with waiting customers is highly desirable because it allows businesses the opportunity to optimize their existing services and offer new services to waiting customers. Traditionally, interacting with individuals waiting in a queue has been inefficient and expensive because employees must either talk with each waiting customer on an ongoing basis or the business must provide sophisticated devices that interact with each waiting customer.

Current systems available for businesses to manage waiting customers, queue them for service, and notify them when service is ready for them have no means of interacting with each waiting customer. These systems include:

Physical queues: customers gather in a small lobby or in an area roped off from other customers, which is awkward, unappealing, and uncomfortable for customers.

Intercom paging systems: customers' names are called out over a loud speaker to a crowd of waiting customers. This system can be cumbersome to manage because some guests may not hear the page the first time their names are called. This could also deteriorate the atmosphere for customers who are currently receiving service.

"Take a number" system: each customer is given a number and an elevated display shows the "Now Serving" number to a crowd of customers. This system has similar problems as the intercom system with regards to crowd management.

On-premises paging systems: products such as a non-interactive multi-modal paging system, such as U.S. Pat. No. 6,542,751 to Blink et al. (2003), are expensive and require guests to remain in the local area so that the device can be activated to notify them that service is available. These systems provide no means to interact with guests or to verify that guests actually received any notification until they return with the pager.

Queue management systems for theme parks: current products relying on queue management systems, such as U.S. Pat. No. 6,529,786 to Sim et al. (2003), are very complex, expensive, cumbersome to implement and manage, require individuals to carry an expensive electronic device, and have many of the same issues as on-premises paging systems.

So, businesses not only cannot interact with waiting individuals they also cannot verify that waiting individuals have received notification that service is available, provide alternative services, or allow individuals to control their place in the queue.

Some combination of the above systems are used to establish priority and class of service: many businesses, such as theme parks, have both physical lines and VIP levels of service for managing waiting individuals.

A restaurant is a typical business concerned with business process throughput and customer wait experiences. Today, many restaurants use on-premises pagers that include features such as flashing lights, attractive shapes, and vibration to notify their waiting customers that their tables are ready. Not only are these devices expensive (in excess of US$50 per pager) for restaurants to provide and awkward for customers to carry, they also provide no way of interactively communicating with waiting customers. Furthermore, restaurants are burdened with managing these paging devices to ensure they are properly charged, replacing them in a timely manner when they fail, and keeping a sufficient inventory of the devices on hand for their customers.

Another example of a business concerned about its business process throughput and customer wait experience is a theme park. Theme parks often have extremely long queues that contain hundreds of customers. Today, theme parks are concerned about their customers' wait experience because long lines are the primary customer complaint for a theme park. Lengthy queues represent lost revenue; if customers are waiting in line for an attraction, they can't be in a store shopping or buying food.

These and other problems exist. While the above mentioned patents and marketplace solutions are a good start, none of them address using devices owned by the customers, collecting information from the customers, providing marketing information to the customers, etc., while they are in wait status. Therefore the need exists for a more better way to manage customer waiting times that allows the establishment to have a more robust way to interact with each customer, while giving the customer a more satisfying waiting experience.

As more people use portable communication devices—e.g., mobile phones—as their primary means of communications, it becomes practical for businesses to use these devices to manage customers waiting in a queue. The mass adoption and availability of telephony, specifically mobile phones and wireless services, provides the foundation for interactive queuing systems.

The present invention allows businesses to communicate with their waiting customers, notify customers that service is available, collect information from customers, and allow customers the freedom to go wherever phone service is available while they wait.

The present invention also allows businesses to market or provide information to waiting customers in the form of text or multimedia messages. Businesses may also collect numbers to build a customer list for future marketing activities. Since businesses can access the system through the Internet, they can integrate interactive queuing into their Web sites and allow customers to view current wait lists and add themselves to the queue via a Web browser, kiosk, or other terminal.

It is an object of the present invention to provide a system wherein businesses can interact with, gain information from, and manage waiting individuals in any service queue.

It is a further object of the present invention to provide a system wherein businesses can further improve their efficiency and quality of service to customers and allow them a better wait experience.

It is a further object of the present invention to provide a system wherein businesses do not have to provide any electronic devices to waiting customers; customers provide their own phones.

It is a further object of the present invention to provide a system wherein businesses can provide options to customers while they wait, such as the opportunity to confirm cancel, delay, or select another service.

It is a further object of the present invention to provide a system wherein customers do not have to remain on-premises or wait in crowded waiting areas.

It is a further object of the present invention to provide a system wherein businesses can track customer responses to collect business operation metrics.

It is a further object of the present invention to provide a system wherein businesses can easily set up and manage voice messages that customers hear and determine the options they are given.

It is a further object of the present invention to provide a system wherein businesses can send text, SMS, or multimedia messages to customers to deliver promotional materials, provide wait-status updates, or other information.

It is a further object of the present invention to provide a system wherein businesses can integrate this invention with other business processes so that other business systems can act on responses from the waiting customers automatically.

It is a further object of the present invention to provide a system wherein businesses can enable customers to add themselves to the wait list through a variety of interfaces such as kiosks, Web interfaces, or other terminals.

Further objects and advantages of the present invention allow businesses to creatively control their customer wait experience in ways not before possible or practical. Any business with a customer wait, either in the form of physical queues or "virtual" lines such as call centers that take calls in the order they are received, can use this invention to improve customers' wait experiences by offering customers more freedom and flexibility as they wait for service. Using this invention, businesses can also offer additional service, increase their current business process efficiency, and better manage the customer wait experience.

SUMMARY OF THE INVENTION

The aforementioned and other objects were achieved by the present invention which is a system for interactive queuing through public communication networks.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

The present invention pertains to a system and method of interactive queue management. Interactive queue management allows businesses or automated systems to easily and efficiently interact with queued customers through their telephones or mobile phones.

The present invention is comprised of a voice component, a messaging component, and a queue management and system administration component.

The voice component of the present invention provides interaction through an Interactive Voice Response (IVR) system or equivalent. The IVR must be capable of making outbound calls either over public telephony networks or over the Internet. The IVR is controlled by other applications to specify what number to dial, what voice message to play, what prompts to play, and how to collect a response. Once the IVR collects the input, it passes the information back to the application or stores it for later access by other applications.

The messaging component of the present invention sends text, SMS, or multimedia messages to customers' mobile phones. These messages could be status reports of wait times, promotions from the business, independent marketing messages and the like.

The queue management and system administration components of the present invention provide the interactive queue management system the infrastructure required for businesses to manage their queues and operate the system.

The present invention is a system that provides a method for interacting with queued individuals comprising, under control of a client system, the entering of initial information necessary to facilitate communication with said queued individuals, the recording of said initial information as stored initial information in a server system, the entering of updated information, the recording of said updated information as stored updated information in a server system, the selecting of relevant information from said stored initial information and said stored updated information, the using of a messaging infrastructure system, the using of interfaces and messaging protocols, the establishing of connectivity to public communication networks, the communicating of said relevant information to devices provided by said queued individuals, the using of an interactive voice response system, the responding to reply information communicated by said queued individuals via said devices, the capturing of said reply information from said devices, the using of a queue client management system, the transmitting of said reply information to a database at said server systems, and the updating of said database.

BRIEF DESCRIPTION OF THE DRAWINGS

The accompanying drawings illustrate a complete embodiment of the invention according to the best modes so far devised for the practical application of the principles thereof, and in which.

Figure 1:
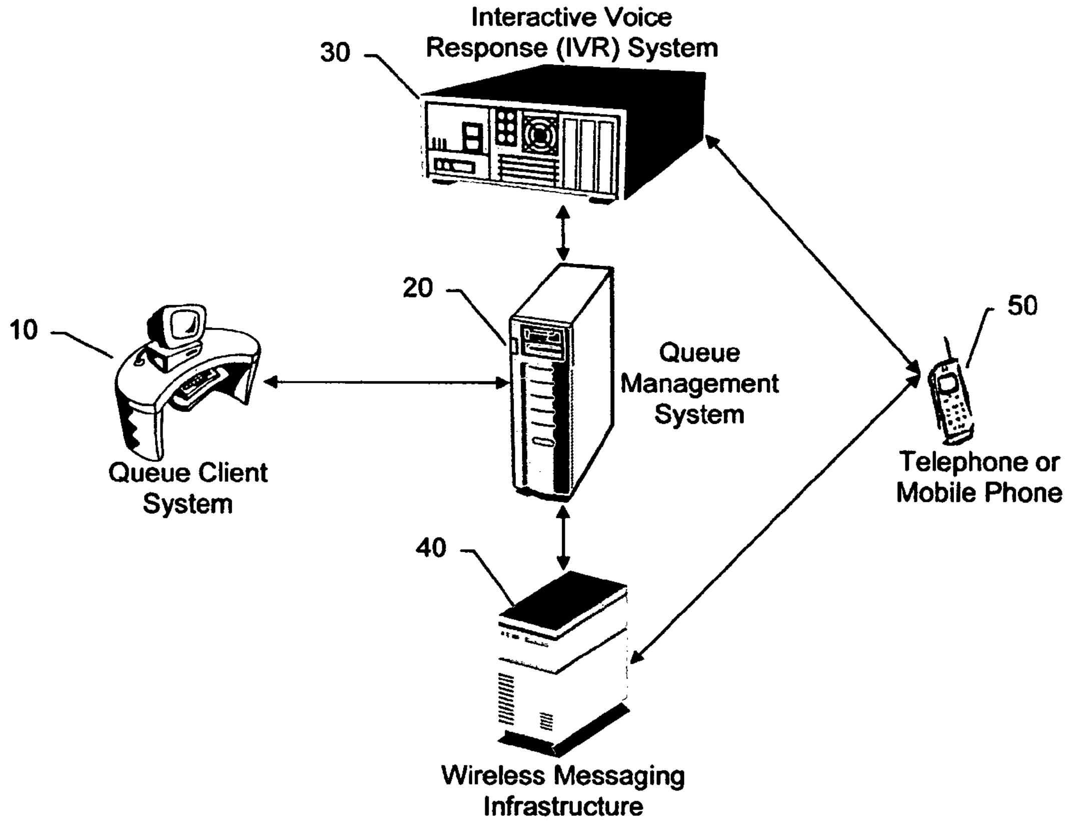
FIG. 1 shows the high-level system components and interconnections recommended to operate the system.

Reference numerals used in the drawings are as follows:

10 queue client system
20 queue management and server system
30 interactive voice response (IVR) system
40 wireless messaging infrastructure
50 telephone or mobile phone

DETAILED DESCRIPTION OF THE DRAWINGS

Figure 2:
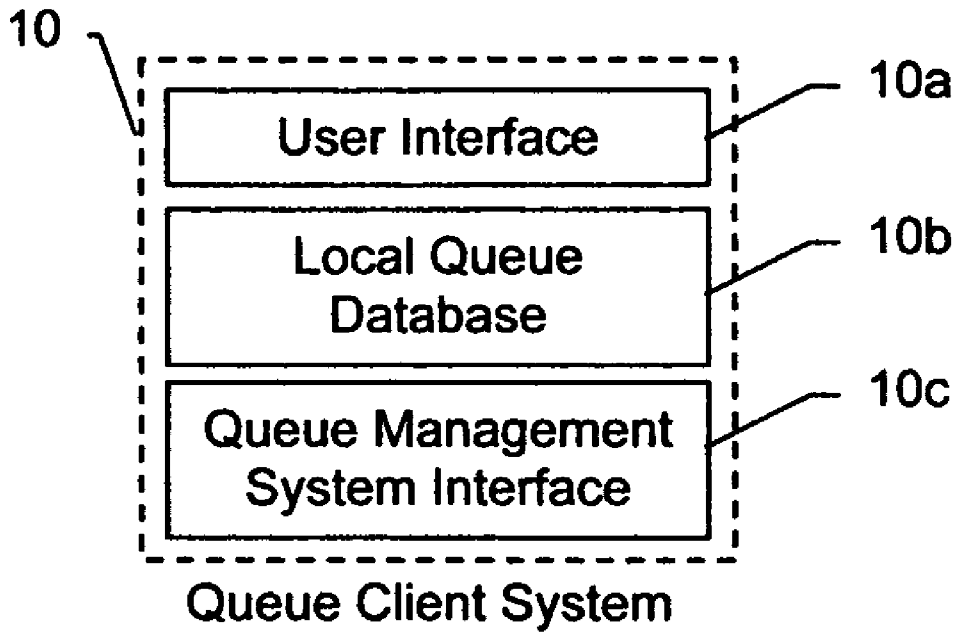
FIG. 2 shows the recommended components of the Queue Client System.
Figure 3:
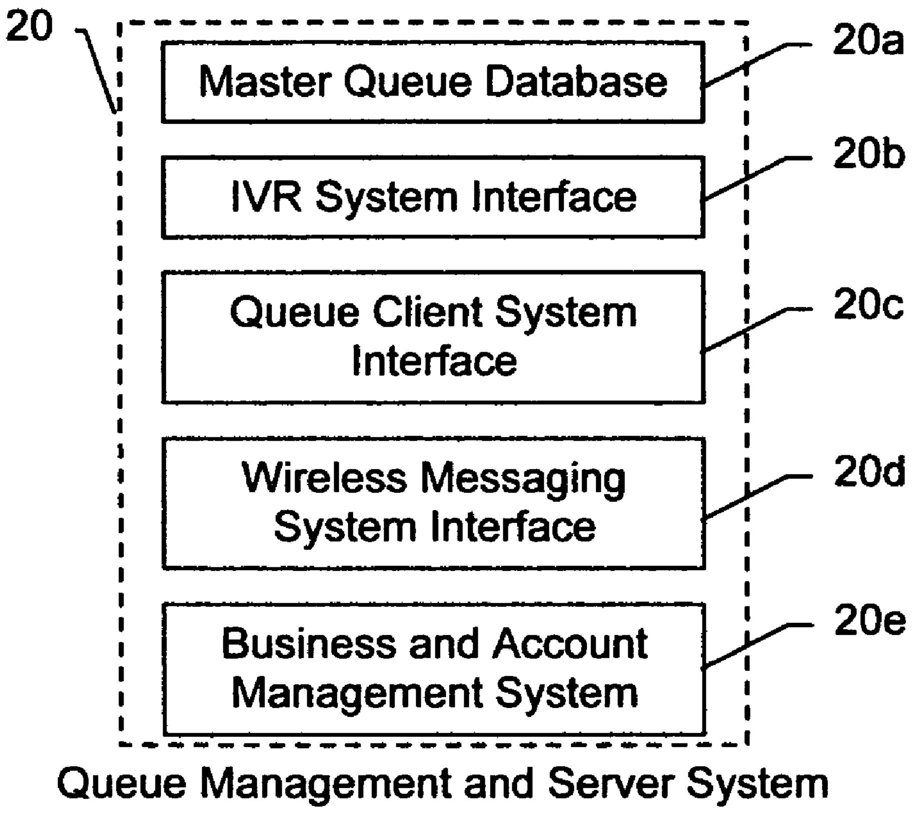
FIG. 3 shows the recommended components of the Queue Management and Server System.

A preferred embodiment of the invention is illustrated in FIG. 1 (High-level system components), FIG. 2 (Queue client system 10 components), and FIG. 3 (Queue management and server system 20 components).

As displayed in FIG. 1, the high-level system comprises of a queue client system 10, a central queue management and server system 20, an interactive voice response (IVR) system 30, a wireless messaging infrastructure 40, and a telephone or mobile phone 50.

Queue client system 10, the primary user interface for managing customer information, enables the entry of phone numbers or updates and other pertinent customer information. All information entered is stored in a local database before client system 10 initiates communication with queue management and server system 20 via the Internet using standard Internet protocols. This communication includes all customer information to be stored in the server system 20 database, as well as the instruction for server system 20 to initiate a session with Interactive Voice Response (IVR) system 30 via the Internet using standard Internet protocols. This exchange includes instructions to IVR system 30 to initiate outbound calls to specified phone numbers in the queue, as well as the stored greetings and prompts that should be played to customers' telephones or mobile phones 50. IVR system 30 will communicate with telephones or mobile phones over Public Switched Telephony Networks (PSTN), Public Land Mobile Networks (PLMN), Internet Protocols (IP), and other widely available computer telephony infrastructures and protocols. As calls to customers are completed, IVR system 30 reports the results to server system 20, which then stores the data and communicates the responses to client system 10.

Queue client system 10 will also interface with server system 20 in order to send text messages in the form of Short Messaging Service (SMS), Multimedia Messaging Service (MMS), Instant Messaging (IM), or other messaging means to mobile phones 50.

Client system 10 will initiate communication with server system 20 that includes the message to be sent, where the message should be sent, results of the action, and any other information required to facilitate communication. After storing this information, server system 20 will pass it along to wireless messaging infrastructure 40 over the Internet using standard Internet protocols. Wireless messaging infrastructure 40 is software specifically designed for application driven messaging to mobile phones 50 and is provided by the telecommunications industry, including mobile network operators, service providers, systems integrators, and equipment manufacturers. Wireless infrastructure 40 interacts with the mobile phone 50 via PSTN, PLMN, IP, or any other computer telephony infrastructures and protocols required to support wireless messaging for applications.

FIG. 2 displays queue client system 10 in more detail. Client system 10 consists of three components: a user interface 10*a*, a local queue database 10*b*, and a queue management system interface 10*c*. Client system 10 is the user interface for sending instructions to and communicating with queue management server system 20. Via user interface 10*a*, the user can access and view the current queue, enter pertinent customer information such as names and phone numbers, update existing customer information, delete customer information, and initiate calls or messages for server system 20.

Local queue database 10*b* stores all information about the customer queue, including times entries are made in the queue, phone numbers, and items such as names, party sizes, preferences, and priorities.

Queue management and server system interface 10*c* contains all the necessary commands, security, and protocols for communication between client system 10 and server system 20.

FIG. 3 displays queue management and server system 20. This system can be used as a standalone or in conjunction with multiple client systems 10. Server system 20 provides the interface for all external systems, as well as redundant storage for client system 10. Server system 20 also provides the interface for initiating voice calls and messaging and for collecting input from those systems. Server system 20 consists of six components: a master queue database 20*a*, an IVR system interface 20*b*, a queue client system interface 20*c*, a wireless messaging system interface 20*d*, and a business and account management system 20*e*.

Master queue database 20*a* stores, organizes, prioritizes and maintains all information for each client system 10. Data stored on master database 20*a* includes copies of information stored at each local queue database 10*b*, as well as billing information, customer greetings, customer messages, and usage metrics for each client system 10. The redundancy of the master queue database 20*a* with the local queue databases 10*b* will be achieved using standard distributed database techniques such as replication and synchronization. However, there may be additional information stored at master database 20*a* that is not stored at local database 10*b* such as queue names or client account number fields.

IVR system interface 20*b* contains all the necessary commands, security, and protocols for communication between queue management server system 20 and IVR system 30.

Queue client system interface 20*c* contains all the necessary commands, security, and protocols for communication between client system 10 and server system 20.

Wireless messaging interface 20*d* provides and controls the protocols for queue management and server system 20 to communicate with wireless messaging infrastructure 40.

Business and account management system 20*e* controls access to and manages all information related to each client system 10 in order to ensure all billing and usage metrics are accurate for each client. Users can also activate their client system 10 accounts, change their billing plans, and view the current usage metrics.

Figure 4:
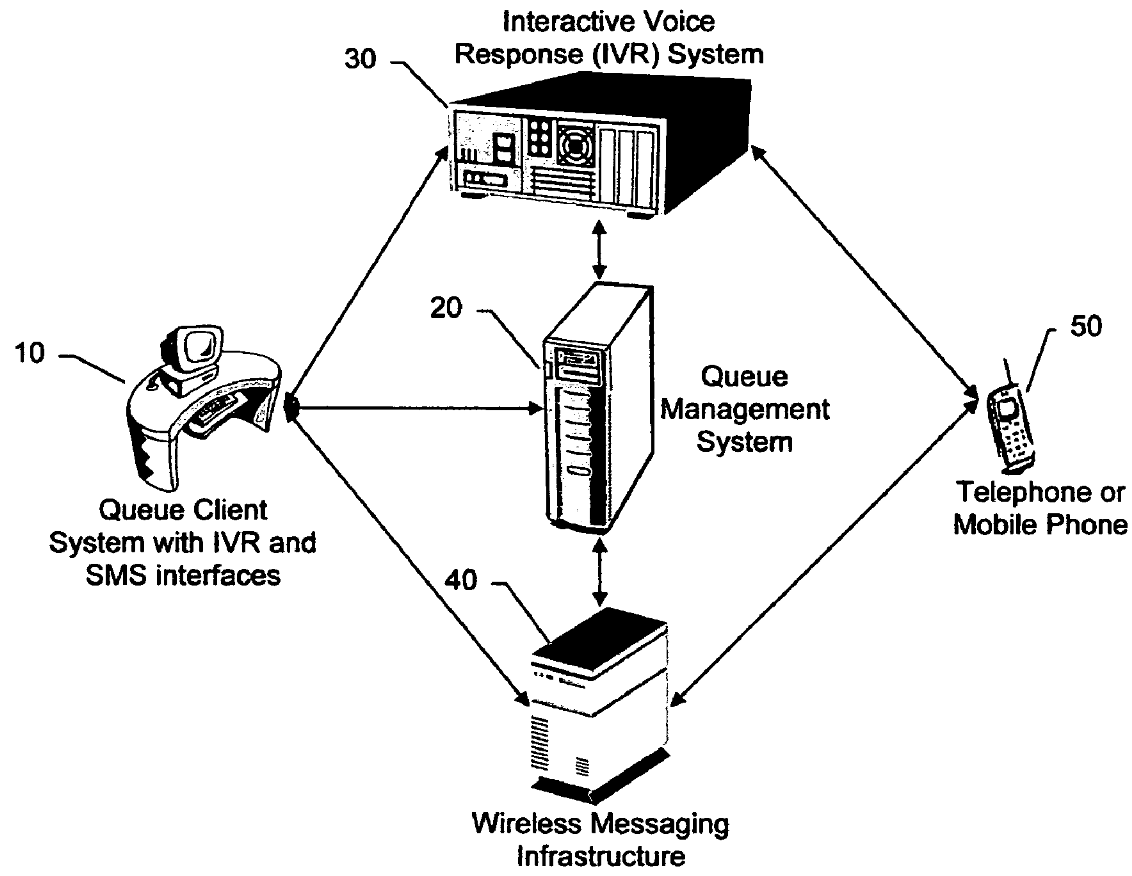
FIG. 4 shows a likely alternative embodiment of the high-level system.

An alternative embodiment of the invention is illustrated in FIG. 4.

As shown in FIG. 4, queue client system 10, the primary user interface for managing guest information, enables the entry or updates of phone numbers and other pertinent customer information. Client system 10 initiates communication with IVR system 30 via the Internet using standard Internet protocols. This communication includes instructions to initiate an outbound call to a specified phone number and play a specific greeting or prompts for the customer's phone or mobile phone 50. IVR system 30 interfaces with telephone or mobile phone 50 over Public Switched Telephony Networks (PSTN), Public Land Mobile Networks (PLMN), Internet Protocols (IP), or other widely available computer telephony infrastructures and protocols. IVR system 30 collects responses to prompts from telephone or mobile phone 50 either through Dual Tone Multiple Frequency (DTMF) or Automatic Speech Recognition (ASR) input methods. IVR system 30 reports to queue client system 10 the status of each call, such as call completed successfully, busy signals, voice mail reached, wrong number, network busy, phone out of range, or any other conditions provided by the public communication networks.

As shown in FIG. 4, all information collected by client system 10, including responses generated via IVR system 30, is stored by queue management and server system 20. Queue client system 10 transmits the information to a database at server system 20 via the public Internet using standard Internet protocols.

As shown in FIG. 4, queue client system 10 will also communicate with wireless messaging infrastructure 40 in order to send text messages in the form of Short Messaging Service (SMS), Multimedia Messaging Service (MMS), or Instant Messaging (IM) to mobile phones 50. Messaging infrastructure 40 is software specifically designed for application-driven messaging to mobile phones 50 and is provided by the telecommunications industry, including mobile network operators, service providers, systems integrators, and equipment manufacturers. Communications with messaging infrastructure 40 contain messages to be sent to mobile phones 50, phone number, where to send the message (address), results of the action, and any other information required to facilitate the exchange. Messages sent via messaging infrastructure 40 will be stored at server system 20 for redundancy.

The present invention depends on a system and process that allows businesses to contact waiting individuals via their telephones or mobile phones in order to manage the individual's wait experience and place in a queue. The present invention contacts each individual, collects a response, organizes the response within a sorted database, and presents this information to the business offering service to the queued individual. Business can contact individuals via voice calls or wireless messages.

Figure 5:
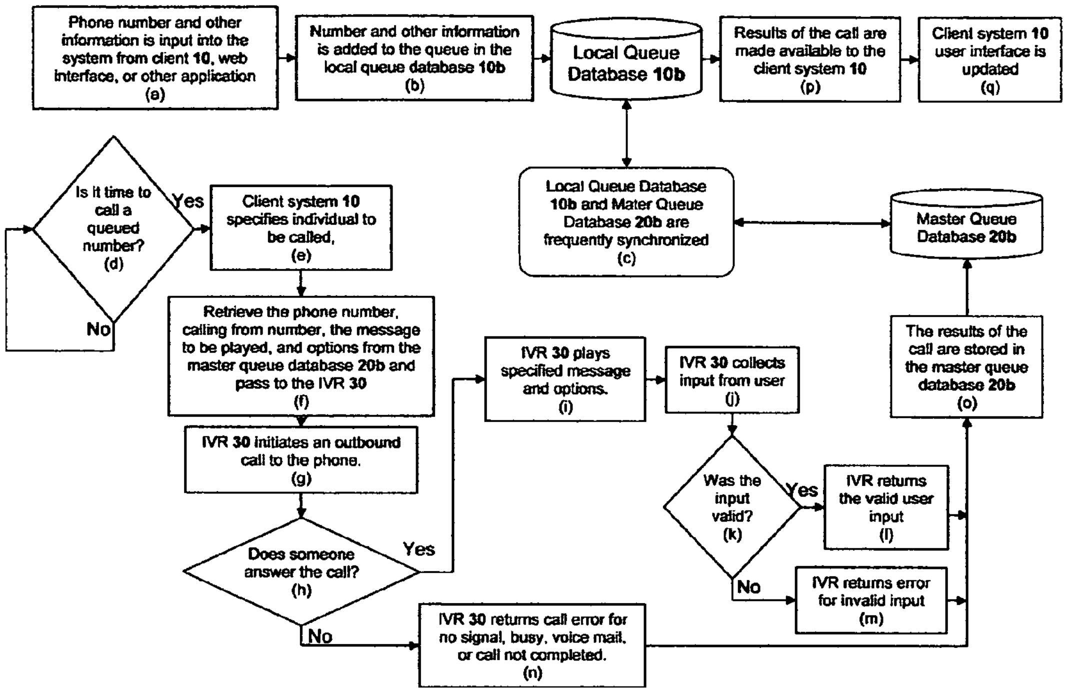
FIG. 5 is a flow chart detailing the likely logic flow of the present invention in operation using the voice components.
Figure 6:
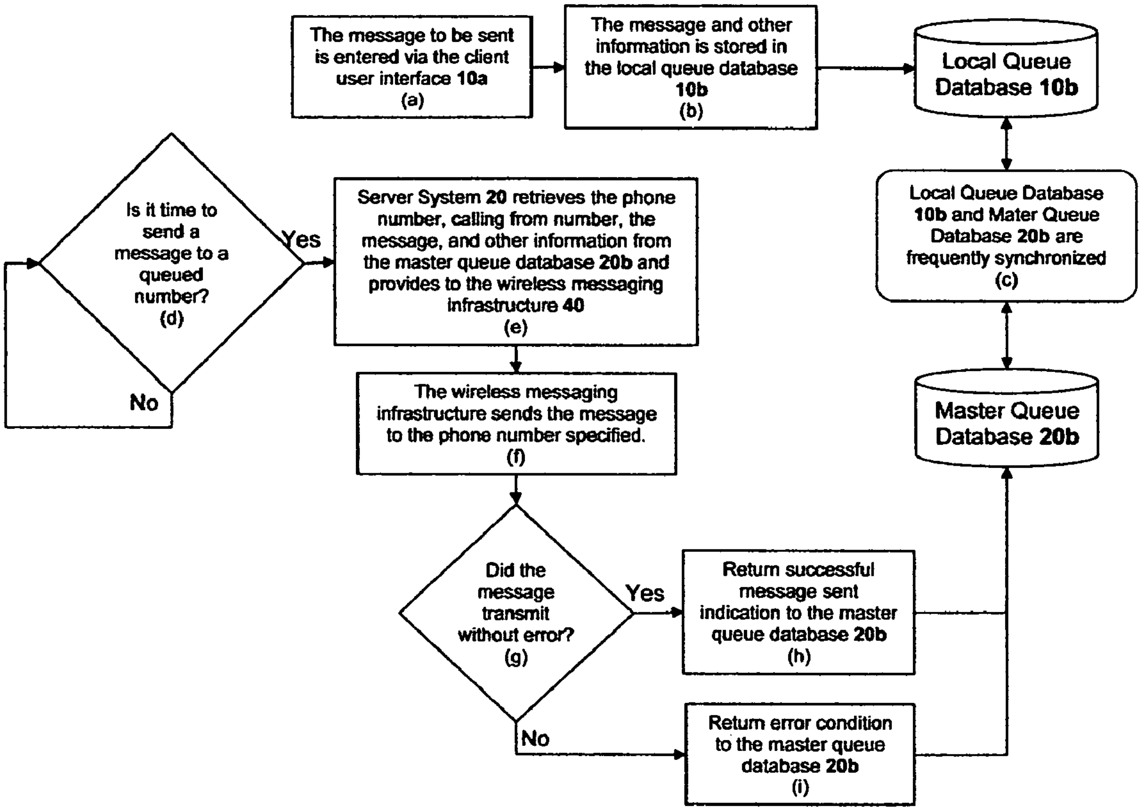
FIG. 6 is a flow chart detailing the likely logic flow of the present invention in operation using wireless messaging components.

The logic and process to operate the invention is described in FIG. 5 and FIG. 6.

FIG. 5 describes the invention's process for calling, communicating with, and collecting responses from an individual via voice calls to telephone or mobile phone 50. The key component that facilitates voice communication is IVR system 30, a commercially available separate component. The detailed description of the process displayed in FIG. 5 follows:

The user enters a phone number and other important customer information into client system 10 via user interface 10*a*.

This information is added to local queue database 10*b* on client system 10.

Local queue database 10*b* is frequently synchronized with or replicated to master queue database 20*a* on server system 20. This is an independent process that runs continuously to ensure the local queue 10*b* and the master queue 20*b* are synchronized. This provides a means for any changes to the queue made on the client system 10*b* to be reflected on the server system 20*b* and vice versa.

At the appropriate time, a call to the waiting individual is initiated via client user interface 10*a*.

Client system 10 contacts server system 20 via standard Internet protocols and prompts server system 20 to initiate a call to the queued individual.

Server system 20 pulls the required information from master database 20*a*, passes the information and instructions to initiate a call to the specified number to IVR system 30. The required information pulled from the master database 20*b* includes the phone number to call, the recorded greeting to play, and the prompts to list for action.

IVR system 30 initiates the outbound call to telephone or mobile phone 50.

IVR system 30 waits for a response from telephone or mobile phone 50.

If IVR system 30 connects successfully to telephone or mobile phone 50, IVR system 30 plays the specified greeting and list of prompts for the individual and awaits input.

IVR system 30 collects the individual's input either through DTMF or ASR input methods. With DTMF, the individual is prompted to press a specific button to communicate a specific action (i.e., "Press 1 to confirm your arrival."). With ASR, the individual is prompted to speak directly with the system in order to convey a preference (i.e., "Say 'Confirm' to confirm your arrival.").

IVR system 30 determines if the individual's input is valid.

If IVR system 30 determines the individual's input is valid, it returns the collected input.

If IVR system 30 determines the individual's input is invalid, it will report an error with the mobile phone input.

IVR system 30 returns an error if the following instances occur: phone is busy; voice mail answers; call is dropped; service is unavailable; number is invalid; call is unanswered; call is not completed for some other reason. Upon receipt of an error condition, the Server System 20 may prompt IVR system 30 to initiate the call again; after two retries resulting in error conditions, Server System 20 will communicate this failure to client system 10.

The result of the call is stored in the Master Queue Database 20*b* and the information is made available to server system 20.

When the master queue database 20*b* synchronizes with the client database 10*b*, the results of the call will be made available to the client system 10.

Client system user interface 10*a* displays the result of the phone call.

FIG. 6 describes the process for the present invention to send text, SMS, multimedia, or instant messages to an individual's phone. Since most landline telephones do not support these features yet, these messages will be received by mobile phones, even though all that the invention requires to send a wireless message is a phone number. Wireless messaging infrastructure 40 facilitates this operation and is a commercially available service or component.

The detailed description of the process displayed in FIG. 6 follows:

The wireless message to be sent is entered via client system user interface 10*a*.

The message is stored in local queue database 10*b* at client system 10.

Local queue database 10*b* is frequently synchronized with or replicated to master queue database 20*a* on server system 20. (This is an independent process that runs continuously to ensure the local queue 10*b* and the master queue 20*b* are synchronized. This provides a means for any changes to the queue made on the client system 10*b* to be reflected on the server system 20*b* and vice versa.)

Server system 20 is prompted to send a wireless message either manually via client user interface 10*a* or automatically at a specified time that is set via client user interface 10*a*.

Server system 20 passes phone numbers, message content, and any other information necessary to facilitate the message to wireless messaging infrastructure 40.

Wireless messaging infrastructure 40 sends the message to the phone number specified.

Wireless messaging infrastructure 40 determines if the message is sent successfully.

If wireless messaging service 40 receives an indication that the message transmission is successful, it reports this success to master queue database 20*a*.

If wireless messaging service 40 receives an indication that the message transmission is unsuccessful in whole or in part for any reason, it reports this failure to master queue database 20*a*.

From the description provided above, a number of advantages of the present invention become evident:

The present invention provides a new and novel way for businesses to enhance their customer wait experiences and improve customer relationships.

The invention does away with the need for complex, expensive queuing systems such as on-premises paging devices, intercoms, and sophisticated crowd controls.

The present invention provides new opportunities for businesses to manage their business processes.

The present invention provides a new channel for businesses to communicate with and market to their customers.

Since the invention is based in software and uses public resources and open standards, it can be integrated easily into almost any business processes application.

Businesses do not need to implement the entire system and can choose to license client system 10 or subscribe to the service offered by an interactive queue service provider who has the complete system.

Thus the present invention provides an efficient and practical means for interactive queue management that is applicable to any business with queued customers concerned about their customers' wait experiences—such as at a restaurant, theme park, hospital, or customer support center. The present invention provides businesses new and novel means to enhance service and increase competitive advantage.

While the above description contains many detailed requirements and descriptions, these are not limitations on the scope of the invention, but the exemplification of one preferred embodiment. Other variations are possible.

For example, the system may use other communication means, such as electronic mail and instant messaging technologies, to communicate with waiting customers who have more sophisticated communication devices, such as smart mobile phones, smart phones, PDAs with wireless Internet access, or handheld computers with wireless Internet access. In this example embodiment the interactive queuing system may not depend heavily on the use of IVR system 30 and customers' telephones or mobile phones 50 and may rely more heavily on the wireless messaging infrastructure 40, e-mail service, or the Internet. Regardless of the communications means used, the invention requires the use of a queuing system to manage waiting customers, interact with these waiting customers, and collect and organize responses.

Accordingly, the scope of the invention should be determined not by the embodiments listed above, but by the appended claims and their legal equivalents.

What is claimed is:

1. A method for interacting with, and marketing to, queued individuals comprising:

under control of a client system, said client system having a user interface, a local database, and an interface for communicating with a server system, entering, into the client system local database, initial information necessary to facilitate communication with said queued individuals, recording said initial information as stored initial information in said server system, said server system having a master queue database, an IVR system interface, a wireless messaging system interface, a business and account management system, and an interface for communicating with said client system, entering updated information, wherein the updated information includes at least one item of data in addition to a telephone number, synchronizing continuously the local database of the client system with the master queue database of the server system over a public network, recording said updated information as stored updated information in said server system, selecting relevant information from said stored initial information and said stored updated information, using a messaging infrastructure system, using interfaces and messaging protocols, establishing connectivity to public communication networks, communicating said relevant information to devices provided by said queued individuals, using an interactive voice response system, responding to reply information communicated by said queued individuals via said devices, capturing said reply information from said devices, tracking said reply information to collect a plurality of business operation metrics in the business and account management system, using a queue client management system, transmitting said reply information to a database at said server system, and updating said database, and communicating, by the queue client management system, marketing and informational messages to said queued individuals via text, SMS, and/or multimedia messages.

2. The method of claim 1, wherein said device is a mobile phone.

3. The method of claim 1, wherein said device is a smart phone.

4. The method of claim 1, wherein said device is a personal digital assistant enabled for voice communication.

5. The method of claim 1, wherein said device is a handheld computer enabled for wireless internet access.

6. A system for interactive queuing through public communication networks, comprising:

a queue client system enabled to interface with at least one interactive voice response system and at least one short message system, said client system having a user interface, a local database, and an interface for communicating with a server system, said server system having a master queue database, an interactive voice response system interface, a wireless messaging system interface, a business and account management system, and an interface for communicating with said client system, said local database of said client system and said master queue database of said server system configured to synchronize continuously over a public communication network;

an interactive voice response system;

a queue management system, said queue management system configured to communicate queue information to a device as provided by a queued individual and to communicate marketing and informational messages to said queued individual via text, SMS, and/or multimedia messages;

a wireless messaging infrastructure; and a portable communications device.

7. The system of claim 6, wherein said portable communications device is mobile phone.

8. The system of claim 6, wherein said portable communications device is a smart phone.

9. The system of claim 6, wherein said portable communications device is a personal digital assistant enabled for voice communications.

10. The system of claim 6, wherein said portable communications device is a handheld computer enabled for internet access.

* * * * *